United States Patent

Suha et al.

[11] Patent Number: 5,843,855
[45] Date of Patent: Dec. 1, 1998

[54] GLASS

[75] Inventors: Zoltan Suha, Budapest; Zsuzsanna Varga, Dunakeszi, both of Hungary

[73] Assignee: General Electric Company, Schenectady, N.Y.

[21] Appl. No.: 784,114

[22] Filed: Jan. 15, 1997

[51] Int. Cl.$^6$ .................................................. C03C 3/693
[52] U.S. Cl. ................... 501/67; 501/65; 501/66; 501/68; 501/69; 501/70; 313/493
[58] Field of Search ................... 501/67, 65, 66, 501/68, 69, 70; 313/493

[56] References Cited

U.S. PATENT DOCUMENTS

| | | | |
|---|---|---|---|
| 4,312,952 | 1/1982 | Carbol | 501/67 |
| 4,540,672 | 9/1985 | Boudot et al. | 501/67 |
| 4,562,161 | 12/1985 | Mennemann et al. | 501/67 |
| 4,565,791 | 1/1986 | Boudot et al. | 501/67 |
| 5,077,240 | 12/1991 | Hayden et al. | 501/67 |
| 5,403,789 | 4/1995 | Kerko et al. | 501/67 |
| 5,405,811 | 4/1995 | Kerko et al. | 501/67 |
| 5,525,553 | 6/1996 | Brocheton et al. | 501/67 |

FOREIGN PATENT DOCUMENTS

| | | | |
|---|---|---|---|
| 19600 | 11/1980 | European Pat. Off. | 501/67 |
| 54-031413 | 3/1979 | Japan | 501/67 |
| 55-007510 | 1/1980 | Japan | 501/67 |
| 2029401 | 3/1980 | United Kingdom | 501/67 |
| 2034300 | 6/1980 | United Kingdom | 501/67 |

*Primary Examiner*—Anthony Green
*Attorney, Agent, or Firm*—Fay, Sharpe, Beall, Fagan, Minnich & McKee

[57] ABSTRACT

The invention is a glass for electric lamps comprising $SiO_2$, $Al_2O_3$, $Na_2O$, $K_2O$, $Li_2O$, BaO, MgO, CaO, ZnO, $B_2O_3$, $TiO_2$, $SbO_3$, $MnO_2$ and one or more of the following $Fe_2O_3$, $As_2O_3$ and $CeO_2$, where ZnO is 3 to 7 weight %,
$B_2O_3$ is 3 to 8 weight %,
$TiO_2$ is 0 to 1.5 weight %,
$Al_2O_3$ is 0.3 to 2.5 weight %,
BaO is 1 to 4.5 weight %,
CaO is 2 to 4.5 weight %,
MgO is 0.5 to 3.7 weight %, and
the sum of ZnO and $B_2O_3$ is equal to at least 8.6 weight % to provide stability of the glass.

17 Claims, 1 Drawing Sheet

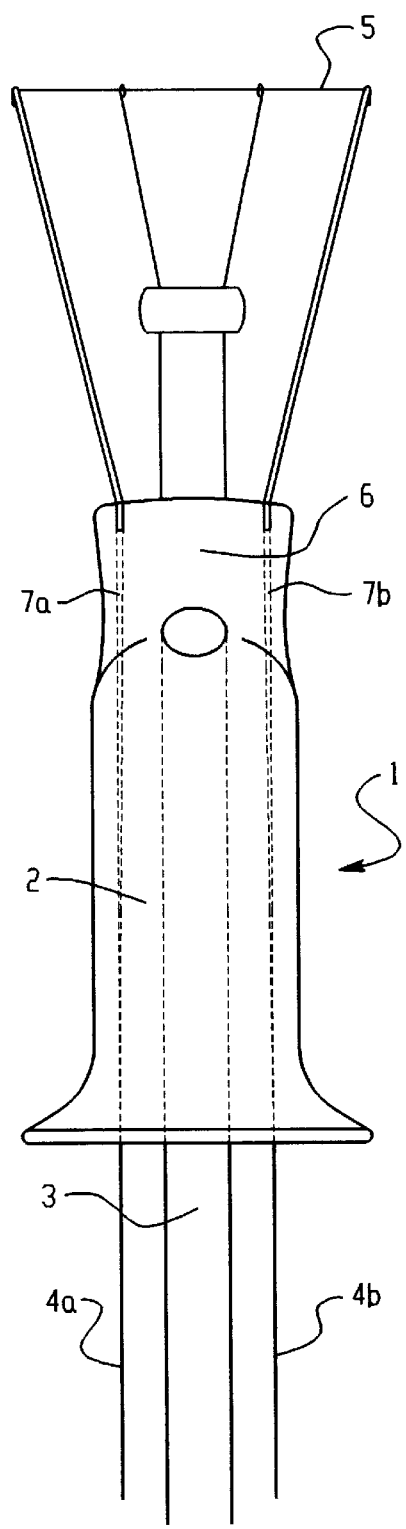
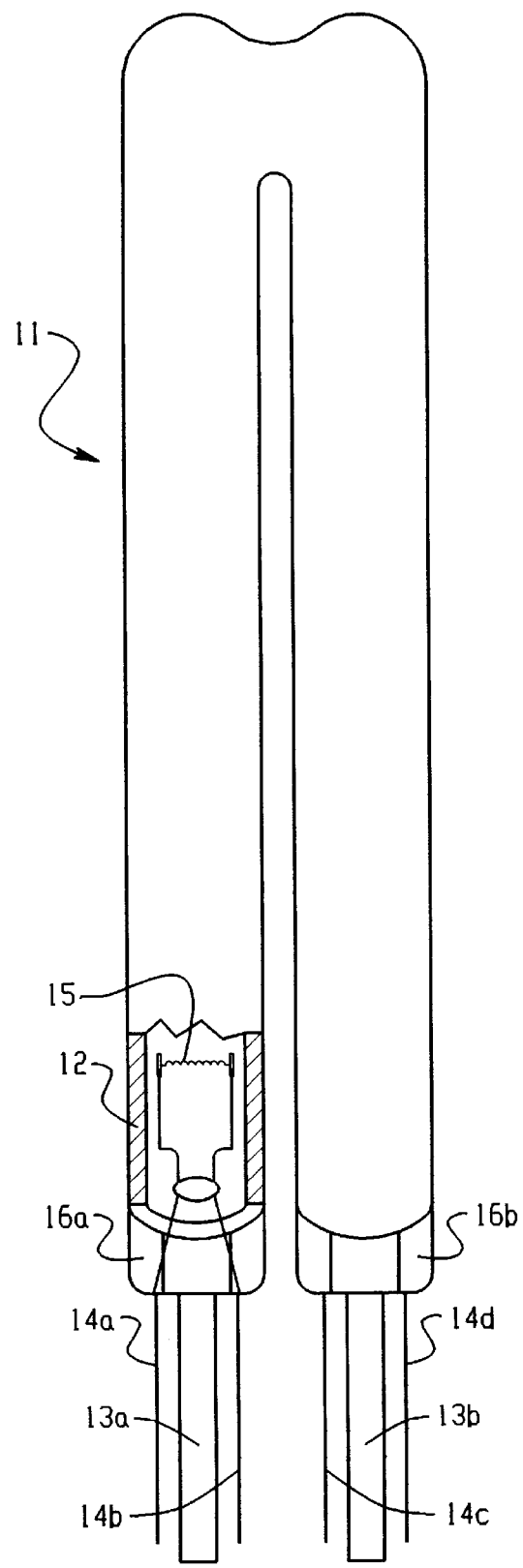
Fig. 1
Fig. 2

GLASS

Background of the Invention

The invention relates to a glass especially, but not exclusively for electric lamps. Certain glass parts of the electric lamps, for example the stems of the incandescent and fluorescent lamps and their exhaust tubes as well as the bulbs of certain fluorescent lamps are usually manufactured from glasses of high lead oxide-content (20–29 weight % of PbO) glasses. The high lead oxide-content contributes to the required high electric resistivity as well as the softness of glass material for the good workability and simultaneously the low production cost.

It is known however, that a high lead oxide-containing glass, both during its production and after its utilization, in the form of waste-material, can adversely affect the environment. For environmental reasons, efforts are made for decreasing or, still more, eliminating the lead from the glass mass products. That was the object of the European Patent EP 603 933, which specified a lead-free glass composition. The glass according to this patent contains $SiO_2$, $Al_2O_3$ $Li_2O$, $Na_2O$ and $K_2O$ components as well as alkaline earth metal oxides; from these latters BaO in 7 to 11 weight %, for meeting the requirements arising in glasses for electric lamps.

In spite of the lead-free composition, the glass according to the patent EP 603 933 cannot be considered as perfect in environmental respects because as it is known the BaO, similarly to the PbO, also adversely impacts the environment.

The aim of the invention is to provide a glass composition, especially for electric lamps, in which the environmental aspects are taken into consideration, therefore the glass contains only a small amount of BaO, and at the same time the production cost does not differ considerably from that of a traditional glass.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 1 is a schematic side view of a stem of an incandescent electric lamp according to the present invention.

FIG. 2 is a schematic side view of a compact fluorescent lamp according to the present invention.

DESCRIPTION OF THE PREFERRED EMBODIMENTS

The invention has arisen from the recognition that in case of making the choice of components in a proper way the BaO content can be reduced while the electrical, thermal expansion, stability, chemical and formability properties of the glass specified for light sources can be kept.

Accordingly, the invention is a glass for electric lamps comprising $SiO_2$, $Al_2O_3$, $Na_2O$, $K_2O$, $Li_2O$, BaO, MgO, CaO, ZnO, $B_2O_3$, $TiO_2$, $Sb_2O_3$, $MnO_2$ and one or more of the following $Fe_2O_3$, $As_2O_3$, and $CeO_2$, where ZnO is 3 to 7 weight %, $B_2O_3$ is 3 to 8 weight %, $TiO_2$ is 0 to 1.5 weight %, $Al_2O_3$ is 0.3 to 2.5 weight %, BaO is 1 to 4.5 weight %, CaO is 2 to 4.5 weight %, MgO is 0.5 to 3.7 weight %, and the sum of ZnO and $B_2O_3$ is equal to at least 8.6 weight % to provide stability of the glass.

The invention is furthermore a glass for electric lamps comprising $SiO_2$ in 58 to 64.5 weight %, $Al_2O_3$ in 0.3 to 2.5 weight %, $Na_2O$ in 6 to 8.5 weight %, $K_2O$ in 7.5 to 11 weight %, $Li_2O$ in 0.5 to 1.2 weight %, BaO in 1 to 4.5 weight %, MgO in 0.5 to 3.7 weight %, CaO in 2 to 4.5 weight %, ZnO in 3 to 7 weight %, $B_2O_3$ in 3 to 8 weight %, $TiO_2$ in 0 to 1.5 weight %, $Sb_2O_3$ in 0 to 0.6 weight %, $As_2O_3$ in 0 to 0.6 weight %, $CeO_2$ in 0 to 0.8 weight %, $MnO_2$ in 0 to 0.3 weight %, $Fe_2O_3$ in 0 to 0.15 weight %.

In addition to the listed components, the glass in accordance with the invention can contain in small quantities other components and contaminants, too, which, for example, can come from the materials and devices of manufacturing, without having any substantial influence on the material properties.

It was found that it is reasonable to choose the components in accordance with the relation given below to maintain the stability of glass together with an optimal softening property:

$$ZnO+B_2O_3 \geq 8.6 \text{ weight \%}.$$

Furthermore, it was found that it is possible to restrict significantly the susceptibility of glass for crystallization if the components are chosen in accordance with the relation given below:

$$TiO_2+Al_2O_3 \geq 0.5 \text{ weight \%}.$$

Furthermore it was found that a glass with high electric resistivity and an adequate softening property can be obtained preferably if the components are chosen in accordance with the relation given below:

$$BaO/CaO \geq 0.5.$$

Furthermore it was found that a high electric resistivity of the glass together with a good workability and, simultaneously, chemical resistance can be ensured preferably if the MgO content is at least 2.1 weight %, as well as the CaO content is at least 3.1 weight %.

Furthermore it was found that for the sake of improving the melting and softening properties it is reasonable to choose the $B_2O_3$ content at least 5.1 weight %.

For the further improvement of stability and softening properties of the glass it is reasonable to choose the $TiO_2$ content between 0.2 and 1.3 weight %. Stability means that the glass has less susceptibility to crystallization and immiscibility.

From the glass according to the invention, a stem for electric lamps can be made across which current lead-ins are passed and sealed into said stem in a vacuum-tight manner, furthermore said stem is sealed in the bulb of the lamp in a vacuum-tight manner by means of an exhaust tube.

Furthermore, from the glass according to the invention a bulb for electric lamps can be made. The exhaust tube of the lamp can also be made from the glass according the invention.

The glass in accordance with the invention is suitable also for linear or compact fluorescent lamps.

The invention will be shown in detail on examples by means of drawings.

The glass compositions according to the invention were melted in a mass of 350 kg at 1390° C. in an intermittent tank furnace heated by natural gas. For the melting the following basic materials were applied: quartz-sand, soda, potash, lithium carbonate, barium carbonate, dolomite, zinc oxide, dehydrated boron, titanium dioxide, manganese dioxide, alumina, antimony oxide as well as sodium nitrate, as a refining agent. The components, except quartz-sand, soda, potash and dehydrated borax, were premixed in a laboratory mixer for 30 minutes. Then all the components were mixed together in a rotary mixer for 30 minutes. From the tank furnace, manual glass tube drawings have also been performed resulting in glass tubes of good quality.

Results of three meltings I, II, III are shown in Table I.

TABLE I

| Chemical composition of glasses as calculated (in wt. %): | | | |
|---|---|---|---|
| | I | II | III |
| $SiO_2$ | 61.50 | 61.40 | 63.46 |
| $Al_2O_3$ | 0.65 | 1.00 | 1.01 |
| $Na_2O$ | 7.43 | 7.13 | 7.14 |
| $K_2O$ | 8.54 | 8.76 | 8.75 |
| $Li_2O$ | 1.15 | 1.00 | 1.00 |
| BaO | 1.39 | 2.19 | 2.19 |
| CaO | 3.79 | 3.79 | 3.79 |
| MgO | 2.70 | 2.70 | 0.70 |
| ZnO | 4.86 | 4.44 | 4.46 |
| $B_2O_3$ | 6.67 | 6.67 | 6.68 |
| $TiO_2$ | 1.00 | 0.50 | 0.50 |
| $Sb_2O_3$ | 0.30 | 0.30 | 0.30 |
| $MnO_2$ | 0.00 | 0.10 | 0.00 |
| $Fe_2O_3$ | 0.02 | 0.02 | 0.02 |

$Fe_2O_3$ as a contaminant, is in the glass which in such a small quantity has still an advantageous effect on thermal properties and stability of the glass.

The properties of the glass in accordance with the invention (I, II, III) are given in Table II compared with that of an example of the glass mentioned in the patent EP 603 933 as well as with characteristics of the 20% lead-containing glass, which latter is widely used in the light source industry.

TABLE II

| Properties: | New I | Glass II | III | Glass of EP 603 933 | Glass with 20% PbO |
|---|---|---|---|---|---|
| $\alpha(50–350) \times 10^7$ 1/°C. | 100.5 | 98 | 99.7 | | 99 |
| $\alpha(25–300) \times 10^7$ 1/°C. | | | | 92.5 | |
| $T_g$ °C. | 509 | 503 | 510 | | 441 |
| $T_L$ °C. | 658 | 660 | 664 | 675 | 630 |
| $T_k$ 100 C. | 324 | 324 | 324 | 290 | 285 |
| $\log\rho(T = 250°\ C.)$ | 9.46 | 9.45 | 9.58 | 8.85 | 8.7 |
| $\log\rho(T = 300°\ C.)$ | 8.42 | 8.41 | 8.38 | | 7.5 |
| $\log\rho(T = 350°\ C.)$ | 7.57 | 7.54 | 7.57 | 7.0 | 6.8 |
| Water durability ml/g | 0.45 | 0.39 | 0.35 | | 2.5 |
| Crystallization $l_{liq}$ °C. | — | 750 | — | 840 | 850 |
| density g/cm³ | 2.61 | 2.61 | 2.61 | 2.62 | 2.80 | where
α (50–350): the thermal expansion coefficient between 50° C. and 350° C. (See ISO Standard 7991).
$T_g$: the transformation temperature (measured by a dilatometer) (See ISO Standard 7884-8)
$T_L$: the so-called Littleton softening point (see the ISO Standard /884-6)
$T_k100$: temperature at which logρ (ohm · cm) = 8.
log ρ(T °C.): logarithm to the base 10 of (ohm · cm) value of DC specific resistance (ρ) at temperature T °C.
Water durability: chemical resistance (leaching) against the distilled water measured on a sample, characterized by the amount of 0.01 n acid used for back titration (see DIN standard 12111)
$T_{liq}$: temperature above which the glass no longer crystallizes within 24 hours In the glass in accordance with the invention the BaO content could be reduced to a value of between 1 and 4.5 weight %. In addition to this environmental benefit a thermal expansion coefficient value can be obtained by the invention so that the glass can be very well adjusted to the dumet lead-in wire of the electric lamps and also to the bulbs of them made from lime alkali silicate glass.

Furthermore, the glass has excellent softening properties, consequently it is fairly workable. Its melting temperature is considerably lower than that of the lead glasses, consequently savings can be reached in the power consumption, furthermore the corrosion of the materials of melting furnace will be also smaller.

An extra good electric resistance, significantly higher than that of the glass of 20% PbO or shown in the specification of the patent EP 603933 can be achieved for the glass in accordance with the invention, by which at the lead-in wires no significant electrolysis can arise which otherwise could dissolve the glass-metal bond; consequently, even at a higher temperature and higher lamp power the lifetime of the light sources is higher.

Similarly, an excellent chemical resistance (water durability) of the glass can be achieved with the invention much more better than that of the lead glasses, consequently the leaching of its components is minimal.

The susceptibility of the glass to crystallization is minimal, i.e. it is stable.

The glass in accordance with the invention can be used preferably where the benefits provided by the properties of the glass are needed, especially, for components of electric lamps. It can be used advantageously as stems in incandescent and low pressure discharge lamps as well as bulbs and exhaust tubes of low pressure discharge lamps, especially compact fluorescent lamps.

The utilization of the glass is shown by the following examples together with drawings.

FIG. 1: Stem of an electric lamp
FIG. 2: Compact fluorescent lamp

The FIG. 1 shows a stem 1 of an incandescent lamp comprising a flare 2, current lead-ins 4a and 4b, a filament 5 and an exhaust tube 3. The filament 5 is pressed into the inner terminal of multipart current lead-in 4a and 4b. The listed parts are heated by a gas flame on the production line and by pinching the flare the parts are sealed in such a manner that portions 7a and 7b of the current lead-ins 4a and 4b made from dumet wire (a copper cladded iron-nickel alloy) get into the pinch 6 of the flare 2. The materials of the said flare 2 and exhaust tube 3 are made from the glass in accordance with the invention. The material of lamp bulb (not shown in FIG. 1.) is made from lime-alkali-silicate glass comprising the following base components: $SiO_2$, $Na_2O$, $K_2O$, CaO, $Al_2O_3$. The flare 2 at its skirt part is sealed into the lamp bulb on the production line.

The stem in accordance with the invention may not only be part of an incandescent lamp but also that of other electric lamps (for example: part of low pressure discharge lamps, especially compact fluorescent lamps, etc.).

FIG. 2. Shows a compact fluorescent lamp comprising two parts. The current lead-ins 14a and 14b of electrode 15 and the current lead-ins 14c and 14d of another electrode (not shown) as well as the exhaust tubes 13a and 13b of said compact fluorescent lamp 11 are sealed into the end of glass envelope 12 at the pinches 16a and 16b. Material of the current lead-ins 14a, 14b, 14c and 14d is made from a 50–50% iron-nickel alloy. Materials of the glass envelope 12 and the exhaust tubes 13a and 13b are made from the glass in accordance with the invention. For the sake of reducing the UV radiation the material of glass envelope 12 contains $CeO_2$, preferably in an amount of 0.4 to 0.6 weight %.

What is claimed is:

1. An electric lamp glass comprising, expressed in terms of weight percent:

| | |
|---|---|
| $SiO_2$ | 58–64.5 |
| $Al_2O_3$ | 0.3–2.5 |
| $Na_2O$ | 6–8.5 |
| $K_2O$ | 7.5–11 |
| $Li_2O$ | 0.5–1.2 |
| $MnO_2$ | 0–0.3 |
| $ZnO$ | 3–7.0 |
| $B_2O_3$ | 3–8.0 |
| $BaO$ | 1–4.5 |
| $MgO$ | 0.5–3.7 |
| $CaO$ | 2–4.5 |
| $TiO_2$ | 0–1.5 |
| $Fe_2O_3$ | 0–.15 |
| $As_2O_3$ | 0–0.6 |
| $CeO_2$ | 0–0.8 | and where $ZnO+B_2O_3 \geq 8.6$ to provide stability of the glass.

2. A glass according to claim 1, wherein the sum of $TiO_2+Al_2O_3 \geq 0.5$ weight %.

3. A glass according to claim 1, wherein the ratio of BaO to CaO24 0.5.

4. A glass according to claim 1, wherein the MgO is at a concentration of at least 2.1 weight %.

5. A glass according to claim 1, wherein the CaO is at a concentration of at least 3.1 weight %.

6. A glass according to claim 1, wherein the $B_2O_3$ is at a concentration of at least 5.1 weight %.

7. A glass according to claim 1, wherein the $TiO_2$ is at a concentration of 0.2 to 1.3 weight %.

8. An electric lamp comprising $SiO_2$ in 58 to 64.5 weight %, $Al_2O_3$ in 0.3 to 2.5 weight %, $Na_2O$ in 6 to 8.5 weight %, $K_2O$ in 7.5 to 11 weight %, $Li_2O$ in 0.5 to 1.2 weight %, BaO in 1 to 4.5 weight %, MgO in 0.5 to 3.7 weight %, CaO in 2 to 4.5 weight %, ZnO in 3 to 7 weight %, $B_2O_3$ in 3 to 8 weight %, $TiO_2$ in 0 to 1.5 weight %, $Sb_2O_3$ in 0 to 0.6 weight %, $As_2O_3$ in 0 to 0.6 weight %, $CeO_2$ in 0 to 0.8 weight %, $MnO_2$ in 0 to 0.3 weight %, $Fe_2O_3$ in 0 to 0.15 weight %.

9. A glass according to claim 8, wherein the sum of $TiO_2+Al_2O_3 \geq 0.5$ weight %.

10. A glass according to claim 8, wherein the ratio of BaO to CaO24 0.5.

11. A glass according to claim 8, wherein, the MgO is at a concentration of at least 2.1 weight %.

12. A glass according to claim 8, wherein the CaO is at a concentration of at least 3.1 weight %.

13. A glass according to claim 8, wherein the $B_2O_3$ is at a concentration of at least 5.1 weight %.

14. A glass according to claim 8, wherein the $TiO_2$ is at a concentration of 0.2 to 1.3 weight %.

15. A stem for electric lamps across which stem current lead-ins pass and are sealed in said stem in a vacuum-tight manner, and said stem is sealed in the bulb of the lamp in a vacuum-tight manner and said stem includes a glass comprising, expressed in terms of weight percent:

| | |
|---|---|
| $SiO_2$ | 58–64.5 |
| $Al_2O_3$ | 0.3–2.5 |
| $Na_2O$ | 6–8.5 |
| $K_2O$ | 7.5–11 |
| $Li_2O$ | 0.5–1.2 |
| $BaO$ | 1–4.5 |
| $MgO$ | 0.5–3.7 |
| $CaO$ | 2–4.5 |
| $TiO_2$ | 0–1.5 |
| $Sb_2O_3$ | 0–0.6 |
| $MnO_2$ | 0–0.3 |
| $Fe_2O_3$ | 0–0.15 |
| $As_2O_3$ | 0–0.6 |
| $CeO_2$ | 0–0.8 | and where $ZnO+B_2O_3 \geq 8.6$ to provide stability of the glass.

16. A bulb for electric lamps, expressed in terms of weight percent:

| | |
|---|---|
| $SiO_2$ | 58–64.5 |
| $Al_2O_3$ | 0.3–2.5 |
| $Na_2O$ | 6–8.5 |
| $K_2O$ | 7.5–11 |
| $Li_2O$ | 0.5–1.2 |
| $BaO$ | 1–4.5 |
| $MgO$ | 0.5–3.7 |
| $CaO$ | 2–4.5 |
| $TiO_2$ | 0–1.5 |
| $Sb_2O_3$ | 0–0.6 |
| $MnO_2$ | 0–0.3 |
| $Fe_2O_3$ | 0–0.15 |
| $As_2O_3$ | 0–0.6 |
| $CeO_2$ | 0–0.8 | and where $ZnO+B_2O_3 24\ 8.6$ to provide stability of the glass.

17. An exhaust tube for electric lamps including a glass comprising, expressed in terms of weight percent:

| | |
|---|---|
| $SiO_2$ | 58–64.5 |
| $Al_2O_3$ | 0.3–2.5 |
| $Na_2O$ | 6–8.5 |
| $K_2O$ | 7.5–11 |
| $Li_2O$ | 0.5–1.2 |
| $BaO$ | 1–4.5 |
| $MgO$ | 0.5–3.7 |
| $CaO$ | 2–4.5 |
| $TiO_2$ | 0–1.5 |
| $Sb_2O_3$ | 0–0.6 |
| $MnO_2$ | 0–0.3 |
| $Fe_2O_3$ | 0–0.15 |
| $As_2O_3$ | 0–0.6 |
| $CeO_2$ | 0–0.8 | and where $ZnO+B_2O_3 \geq 8.6$ to provide stability of the glass.

* * * * *